US012455941B2

(12) United States Patent
Dong

(10) Patent No.: US 12,455,941 B2
(45) Date of Patent: Oct. 28, 2025

(54) SYSTEMS AND METHODS FOR FACIAL RECOGNITION TRAINING DATASET ADAPTATION WITH LIMITED USER FEEDBACK IN SURVEILLANCE SYSTEMS

(71) Applicant: Fortinet, Inc., Sunnyvale, CA (US)

(72) Inventor: Xihua Dong, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 997 days.

(21) Appl. No.: 17/325,943

(22) Filed: May 20, 2021

(65) Prior Publication Data

US 2022/0374656 A1 Nov. 24, 2022

(51) Int. Cl.
| | |
|---|---|
| G06K 9/62 | (2022.01) |
| G06F 18/21 | (2023.01) |
| G06F 18/214 | (2023.01) |
| G06F 18/2413 | (2023.01) |
| G06N 5/04 | (2023.01) |
| G06N 20/00 | (2019.01) |
| G06V 40/16 | (2022.01) |
| G06V 20/52 | (2022.01) |

(52) U.S. Cl.
CPC ...... *G06F 18/2148* (2023.01); *G06F 18/2178* (2023.01); *G06F 18/2413* (2023.01); *G06N 5/04* (2013.01); *G06N 20/00* (2019.01); *G06V 40/172* (2022.01); *G06V 20/52* (2022.01)

(58) Field of Classification Search
CPC ............ G06F 18/2148; G06F 18/2178; G06F 18/2413; G06N 5/04; G06N 20/00; G06V 40/172; G06V 20/52; G06V 10/82; G06V 10/774
See application file for complete search history.

(56) References Cited

U.S. PATENT DOCUMENTS

| | | | |
|---|---|---|---|
| 2013/0247175 A1* | 9/2013 | Nechyba | G06V 40/16 726/19 |
| 2015/0161482 A1* | 6/2015 | Preetham | G06F 18/29 382/159 |
| 2018/0068173 A1* | 3/2018 | Kolleri | G06Q 10/10 |

FOREIGN PATENT DOCUMENTS

| | | | | |
|---|---|---|---|---|
| CN | 112434661 A | * | 3/2021 | G06F 18/22 |

OTHER PUBLICATIONS

U.S. Appl. No. 17/135,887, filed Dec. 28, 2020, Dong.
U.S. Appl. No. 17/135,867, filed Dec. 28, 2020, Dong.

* cited by examiner

*Primary Examiner* — Mekonen T Bekele
(74) *Attorney, Agent, or Firm* — Jaffery Watson Hamilton & DeSanctis LLP

(57) ABSTRACT

Various embodiments provide systems and methods for updating a training dataset so that the generated machine learning model can adapt to both short-term and long-term face variations including, for example, head pose, dressing, lighting conditions, and/or aging.

17 Claims, 9 Drawing Sheets

SYSTEMS AND METHODS FOR FACIAL RECOGNITION TRAINING DATASET ADAPTATION WITH LIMITED USER FEEDBACK IN SURVEILLANCE SYSTEMS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

BACKGROUND

Field

Embodiments of the present disclosure generally relate to facial recognition and facial image quality prediction. In particular, embodiments of the present disclosure relate to systems and methods for updating a training dataset so that it can adapt to both short-term and long-term face variations including, for example, head pose, dressing, lighting conditions, and/or aging.

Description of the Related Art

Facial recognition systems, also referred to as face recognition systems, provide the capability to computing devices to match a human face captured in an image or video feed against a database of faces. In face recognition (FR) systems, facial features are used to perform matching operations to differentiate one person from others. Advanced machine learning algorithms, such as Deep Neural Networks (DNNs), may be used to compute facial features. For example, FaceNet™, one of the most widely used DNNs, extracts features from facial images and outputs feature vectors. This feature vector is referred as "embeddings" as the information of interest from the processed image is embedded within the feature vector.

SUMMARY

Various embodiments provide systems and methods for updating a training dataset so that the generated machine learning model can adapt to both short-term and long-term face variations including, for example, head pose, dressing, lighting conditions, and/or aging.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Figure 1:
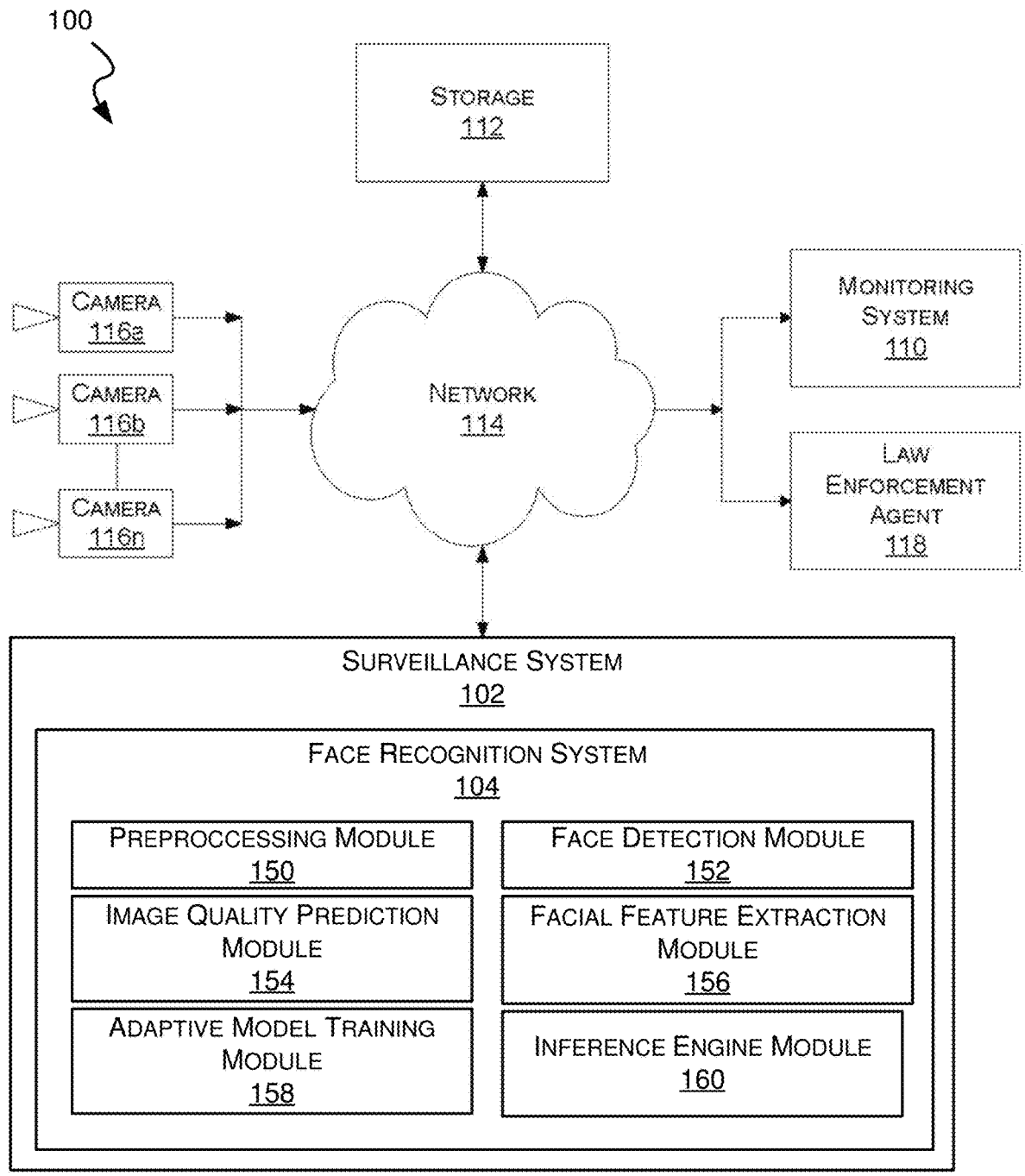
FIG. 1 illustrates an example network environment in which a face recognition system is deployed in accordance with some embodiments.

Various embodiments provide systems and methods for updating a training dataset so that the generated machine learning model can adapt to both short-term and long-term face variations including, for example, head pose, dressing, lighting conditions, and/or aging.

Various embodiments provide systems and methods for developing useful training datasets. Such training datasets play an important role in successful implementation of facial recognition systems, because they can be used to generate the machine learning models. Especially, if the well-known KNN algorithm is applied for classification, a training dataset itself can be considered as a machine learning model. A good training dataset covers a wide range of face variations, both short-term and long-term. In some cases, embodiments provide for reducing computation complexity of a facial recognition system by selectively reducing the size of the training dataset by eliminating less valuable samples from the training dataset. In some cases, such reduction in the size of the training dataset is done based at least in part on an assigned score of each sample in the training dataset. This assigned score is updated based on limited user feedback and decision output. Such scoring allows for adaptive modification of samples retained within the training dataset.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Various embodiments may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details Terminology Brief definitions of terms used throughout this application are given below.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed there between, while not sharing any physical connection with one another. Based on the disclosure provided herein, one of ordinary skills in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "surveillance system" or a "video surveillance system" generally refers to a system including one or more video cameras coupled to a network. The audio and/or video captured by the video cameras may be live monitored and/or transmitted to a central location for recording, storage, and/or analysis. In some embodiments, a network security appliance may perform video analytics on video captured by a surveillance system and may be considered to be part of the surveillance system.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPsec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Various embodiments provide facial recognition systems that include a processing resource and a non-transitory computer-readable medium. The non-transitory computer-readable medium has stored therein: (a) training dataset including a plurality of image feature vectors that correspond to the same individual, where each sample of the plurality of image feature vectors in the training dataset includes a respective sample score; and (b) instructions. The instructions when executed by the processing resource cause the processing resource to: receive an input image; receive a match score indicating a correspondence of the input image to a first sample in the training dataset; and based at least in part upon the match score, modify a sample score corresponding to the first sample.

In some instances of the aforementioned embodiments, the non-transitory computer-readable medium further includes instructions that when executed by the processing resource cause the processing resource to: compare the input image with at least a subset of the samples in the training dataset; and generate the decision output. In various instances of the aforementioned embodiments, modifying the first sample score includes incrementing the first sample score.

In some instances of the aforementioned embodiments, the non-transitory computer-readable medium further includes instructions that when executed by the processing resource cause the processing resource to: receive a user feedback about the label of the input image (ground-truth). Upon the user feedback about the label of the input image (ground-truth), the modifying the first sample score includes incrementing the first sample score by a first value where the label of the input image is equal to the label of the first sample; and decrementing the first sample score by the first value where the label of the input image is not equal to the label of the first sample.

In some cases, the non-transitory computer-readable medium further includes instructions that when executed by the processing resource cause the processing resource to: identify a failure to receive a user feedback about the label of the input image (ground-truth). Upon failure to receive the user feedback about the label of the input image (ground-truth), the modifying the first sample score includes incrementing the first sample score by a second value where the sample label is equal to the decision output; and decrementing the first sample score by the second value where the sample label is not equal to the decision output. In some such cases, a magnitude of the second value is less than a magnitude of the first value because the decision output has lower confidence than user feedback (ground-truth).

In various instances of the aforementioned embodiments, the non-transitory computer-readable medium further includes instructions that when executed by the processing resource cause the processing resource to: receive an optional user feedback indicating the label of the input image (ground-truth), wherein the second sample is one of the plurality of feature vectors in the training dataset; and based at least in part upon the match score between the label of the input image and the label of the second sample, modify a second sample score corresponding to the second sample. In one or more instances of the aforementioned embodiments, the non-transitory computer-readable medium further includes instructions that when executed by the processing resource cause the processing resource to remove the first sample from the training dataset based at least in part upon the first sample score.

Other embodiments provide methods for building a training dataset. Such methods include: receiving an input image by a processing resource; receiving, by the processing resource, and optional user feedback about the label of the input image (ground-truth), where the first training sample is one of the plurality of feature vectors in the training dataset; and modifying, by the processing resource, a first sample score corresponding to the first sample based at least in part upon the user feedback.

In some instances of the aforementioned embodiments, the methods further include receiving, by the processing resource, a user feedback about the label of the input image (ground-truth). In such instances, modifying the first sample score corresponding to the first sample includes incrementing the first sample score by a first value where the label of first sample is equal to the label of the input image; and modifying the first sample score corresponding to the first image includes decrementing the first sample score by the first value where the match score is not equal to the sample score. In some cases, the methods further include identifying, by the processing resource, a failure to receive a user feedback about the label of the input image (ground-truth). In such instances, modifying the first sample score corresponding to the first image includes incrementing the first sample score by a second value where the sample label is equal to the decision output; and modifying the first sample score corresponding to the first sample includes decrementing the first sample score by the second value where the sample label is not equal to the decision output. In some cases, a magnitude of the first value is less than a magnitude of the second value. In particular cases, a magnitude of the second value is less than that of a magnitude of the first value.

In various instances of the aforementioned embodiments, the methods further include removing, by the processing resource, the first sample from the training dataset based at least in part upon the first sample score. In some instances of the aforementioned embodiments, the methods further include adding the input image to the training dataset as a second sample in the training dataset.

Yet other embodiments provide non-transitory computer-readable storage media embodying a set of instructions, which when executed by one or more processing resources of a computer system, causes the one or more processing resources to perform a method including: receiving an input image; receiving a match score indicating a correspondence of the input image to a first training sample, where the first training sample is one of the plurality of image feature vectors in the training dataset; and modifying a first training sample score based at least in part upon the user feedback.

Turning to FIG. 1, an example network environment 100 is shown in which a face recognition system 104 is deployed in accordance with some embodiments. In the context of the present example, face recognition system 104 is deployed as part of a surveillance system 102. While this embodiment discusses face recognition system 104 as part of a surveillance system, one of ordinary skills in the art will recognize a variety of other systems or devices in which or with face recognition system 104 may be deployed. For example, face recognition system 104 may be incorporated in a physical security control system or another facial recognition-based authentication system.

Surveillance system 102 receives video feeds (also referred to as video frames) from one or more cameras (e.g., cameras 116a-n) installed at different locations. The cameras 116a-n may deliver high-resolution video frames (e.g., 1280×720, 1920×1080, 2560×1440, 2048×1536, 3840×2160, 4520×2540, 4096×3072 pixels, etc.) via a network 114 with high frame rates. The video frames captured from the cameras 116a-n may be input into the face recognition system 104. Different entities, such as camera 116a-n, surveillance system 102, and monitoring system 110, devices of law enforcement agent 118, storage 112 may be on different computing devices connected through network 114, which may be a LAN, WAN, MAN, or the Internet. Network 114 may include one or more wired and wireless networks and/or connection of networks. The video feeds received from each of these cameras may be analyzed to recognize human faces.

According to one embodiment, face recognition system 104 analyzes the video feeds or images to recognize human faces using a machine learning model. Face recognition system 104 may be designed using a Deep Neural Network (DNN) machine learning model to recognize human faces in the video feeds or an image. In the context of the present example, face recognition system 104 includes a preprocessing module 150, a face detection module 152, an image quality prediction module 154, a facial feature extraction module 156, an adaptive model training module 158, and an inference engine module 160.

Preprocessing module 150 is configured to receive a video input (or a still image input) from, for example, one of camera 116, and to extract image frames from the video input. In addition, preprocessing module 150 is configured to apply one or more image processing operations to the extracted frame (or received still image) to enhance the image for facial recognition. Such image processing operations may include, but are not limited to, whitening, scaling, and/or de-blurring as are known in the art. Based upon the disclosure provided herein, one of ordinary skills in the art will recognize a variety of image processing operations that may be applied. The resulting processed image is provided to face detection module 152.

Face detection module 152 is configured to apply one or more face recognition algorithms to the scene within the image received from preprocessing module 150. Application of the face detection algorithm(s) yields one or more face images derived from the received image. Such face detection algorithms may include, but are not limited to, Multi-Task Cascaded Convolutional Neural Networks (MTCNN) and/or TinaFace as are known in the art. Based upon the disclosure provided herein, one of ordinary skills in the art will recognize a variety of face recognition algorithms that may be applied yield the face image(s). The resulting face image(s) are provided to both image quality prediction module 154 and facial feature extraction module 156.

Facial feature extraction module 156 is configured to extract facial features from each face image provided from face detection module 152 to yield feature vectors that describe each face included in the received face images. To do so, facial feature extraction module 156 may apply a deep neural network (DNN) algorithm. Such DNN algorithms may include, but are not limited to, FaceNet™, and/or ArcFace™ as are known in the art. Based upon the disclosure provided herein, one of ordinary skills in the art will recognize a variety of DNN algorithms that may be used in relation to different embodiments to yield the feature vectors. Image quality prediction module 154 is configured to score the face images received from face detection module 152 to yield quality scores indicative of the quality of the respective face images. Any scoring approach known in the art may be used. As some examples, commercially available FaceQNet™ and/or HopeNet™ may be used in relation to some embodiments. As another example, the scoring methods described in U.S. patent application Ser. No. 17/135,867 entitled "JOINT FACIAL FEATURE EXTRACTION AND FACIAL IMAGE QUALITY ESTIMATION USING A DEEP NEURAL NETWORK (DNN) TRAINED WITH A CUSTOM-LABELED TRAINING DATASET AND HAVING A COMMON DNN BACKBONE", and filed Dec. 28, 2020 by Dong may be used in accordance with some embodiments. The entirety of the aforementioned reference is incorporated herein by reference for all purposes. A quality thresholding module included as part of image quality prediction module 154 uses the generated quality scores to determine whether to perform image classification on feature vectors generated by facial feature extraction module 156. Where a quality score is too low, no facial image classification is performed. Otherwise, where a quality score is sufficiently high, feature vectors are provided to inference engine module 160 for application of a match determination algorithm.

Inference engine module 160 is configured to compare feature vectors provided by facial feature extraction module 156 with a number of samples corresponding to known persons available in a training dataset. The comparison results in distances between the input feature vectors with samples in the training dataset. Based on the comparison results, inference engine module 160 applies an image classification algorithm to obtain the decision output (predicted label of the input image). In some embodiments, the image classification algorithm is a K-Nearest Neighbors (KNN) classification algorithm as is known in the art. Based upon the disclosure provided herein, one of ordinary skills in the art will recognize other image classification algorithms that may be used in relation to other embodiments.

The output of a KNN classification algorithm is a class membership (a label of face image for face recognition application). A received face image is classified by a plurality vote of its neighbors in the training dataset (i.e., the received face image is assigned to the class that is most common among its k nearest neighbors). If the number of nearest neighbors is one, then the received face image is simply assigned to the class of that single nearest neighbor. Where there are more than one nearest neighbor, then the received face image is assigned to the class that represents more of the nearest neighbors. Thus, a threshold difference from the received face image used to define what is included as a nearest neighbor can strongly impact classification. Again, while this embodiment is described as using a KNN algorithm, other facial image detection algorithms may be used in relation to different embodiments.

Adaptive model training module 158 is configured to implement an adaptive algorithm for updating training dataset and produce machine learning model if necessary (with KNN algorithm, the training dataset itself can be considered as the machine learning model). Model training module 158 scores samples of known individuals maintained in the training dataset, adds newly received samples to the number of face image samples from an identified individual, and removes samples that have a score suggesting that they are not as useful. In some embodiments, adaptive model training module 158 operates similar to that discussed below in relation to FIGS. 5A-5B.

As those skilled in the art will appreciate, while face recognition system 104 is described in the context of human face recognition, the methodologies described herein may be useful to object recognition more generally. As such, an object recognition system can similarly be designed with an object quality prediction module and an object feature extraction module, and both configured to use a common DNN backbone. For example, the DNN may be trained to recognize a specific object type; and instead of predicting a score for suitability for facial detection, which looks for a face, the object quality prediction module can be trained to output a score indicative of the quality of an image at issue for extracting features associated with the object type at issue. Similarly, the object feature extraction module may be trained for extracting features specific to the particular object type. Depending upon the particular implementation, face recognition system 104 may use local compute and/or storage resources or cloud resources for predicting facial quality and extracting facial features using DNN.

Figure 2:
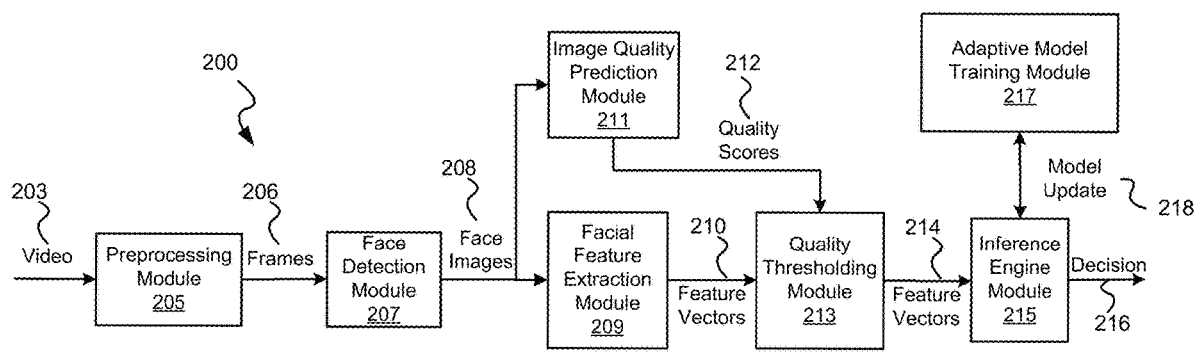
FIG. 2 depicts a facial recognition system including an adaptive model training module in accordance with various embodiments.

Turning to FIG. 2, a block diagram of a facial recognition system 200 is shown that includes an adaptive model training module 217 in accordance with various embodiments.

Preprocessing module 205 is the same as module 150 in FIG. 1, which has been explained above.

Face detection module 207 is the same as module 152 in FIG. 1, which has been explained above.

Image quality prediction module 211 is the same as module 154 in FIG. 1, which has been explained above.

Facial feature extraction module 209 is the same as module 156 in FIG. 1, which has explained above.

Adaptive model training module 217 is the same as module 158 in FIG. 1, which has been explained above.

Inference engine module 215 is the same as module 160 in FIG. 1, which has been explained above.

Quality thresholding module 213 uses the generated quality scores to determine whether to perform image classification on feature vectors generated by facial feature extraction module 209. Where a quality score is too low, no facial image classification is performed. Otherwise, where a quality score is sufficiently high, feature vectors are provided to inference engine module 215 for application of a match determination algorithm.

Figure 3:
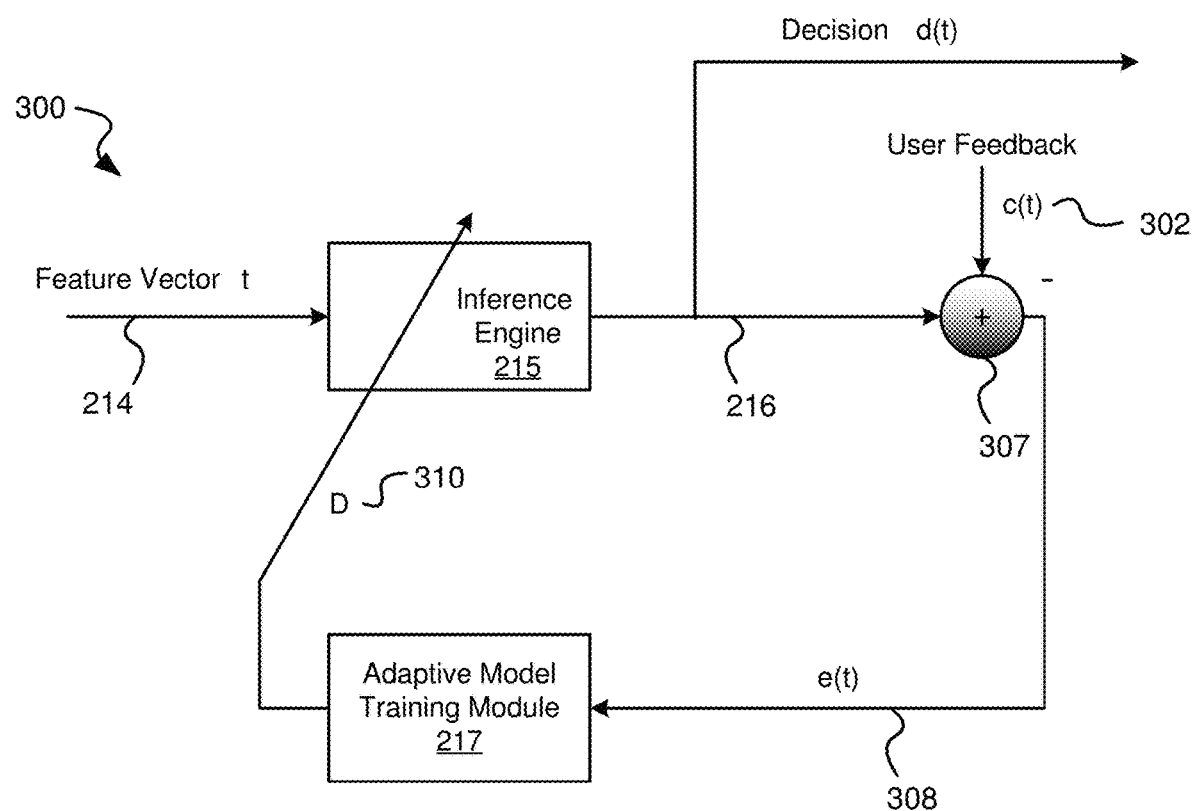
FIG. 3 is a block diagram of the adaptive model training system that may be used in relation to some embodiments.

Turning to FIG. 3, a block diagram 300 including inference engine 215 and model training module 217 is shown that is capable adaptive feedback based model training. As shown, feature vectors 214, (e.g., t), are provided to inference engine 215 that is configured to compare feature vectors 214 with a number of samples from a training dataset, D, maintained and adapted by model training module 217. The samples correspond to previously identified persons. As discussed above, the comparison may be done using a KNN algorithm that provides classification decisions 216, d(t), based upon k-nearest neighbors (i.e., closely related images) from the training dataset.

The classification decision 216 is combined with an optional user feedback 302, c(t), using a combining module 307 to yield a difference, e(t), output 308 that is used by model training module 217 to adaptively modify the training dataset (and thus produce an machine learning model). In some embodiments, model training module 217 adaptively modifies the training dataset in accordance with the following algorithm. For the algorithm, D denotes the training dataset, t denotes the facial feature vector of the received image, s denotes a sample feature vector in D, l(s) denotes the label of s, and d(s, t) denotes a distance between the sample (i.e., s) and the input feature vector (i.e., t). For each feature vector t and distance r, $U_D(t, r)$ denotes the neighborhood of t within distance r, i.e., $U_D(t, r) = \{x \in D | d(x, t) | r\}$.

For each sample s in D, v(s) denotes the score associated with the particular sample s. For each feature vector t, d(t) denotes the decision of the image classifier and c(t) denotes the user feedback (i.e., c(t)) where available. The user feedback (i.e., c(t)) is typically a human user input indicating the validity of any decision output indicated by d(t). $R_1$, $R_2$, and $R_3$ denote distance thresholds; $\alpha$ and $\beta$ denote step sizes for score updating; and N denotes the size limit of the training dataset.

The following pseudocode summarizes the proposed adaptive algorithm for updating the training dataset.

```
/* initialize the training dataset*/
D ⇐ { }.                                                              (1)
FOR each facial vector t:
  /* update score using user feedback (i.e., c(t)) when available */
  IF user feedback is available:
    FOR each sample s in U_D(t, R_1):
      IF l(s) = c(t):
        v(s) ⇐ v(s) + α                                               (2)
      ELSE:
        v(s) ⇐ v(s) − α                                               (3)
      END
    END
  ELSE:
  /* update score using decision output when user feedback is unavailable */
    FOR each sample s in U_D(t, R_2):
      IF l(s) = d(t):
        v(s) ⇐ v(s) + β                                               (4)
      ELSE:
        v(s) ⇐ v(s) − β                                               (5)
      END
    END
  END
  /*adding to or eliminating from the training dataset */
  IF c(t) is available and U_D(t, R_3) = { }:
    D ⇐ D + {t}                                                       (6)
  END
  IF |D| > N:
    D ⇐ D − {s*}, where s* = argmin{v(s)|s ∈ D}                       (7)
  END
END
```

Initially the reference image dataset (i.e., D) includes no sample feature vectors (i.e., s) (identified as equation 1). As shown in the preceding algorithm, where the user feedback 302, (i.e., c(t)) is available, any sample (i.e., s) in the training dataset (i.e., D) which is close to the received feature vectors 214 (i.e., t) and has the same label (i.e., l(s)) is promoted (i.e., the score of the sample is increased by a) (identified as equation 2). In contrast, any sample (i.e., s) in the training dataset (i.e., D) which is close to the to the received feature vectors 214 (i.e., t) but has different label is demoted (i.e., the score of the sample is decreased by α) (identified as equation 3).

Alternatively, if the user feedback 302 (i.e., c(t)) is unavailable, it is assumed that decision 216 (i.e., d(t)) is correct, albeit with lower confidence, the scores of neighbor samples of t in the training dataset (i.e., D) are updated with tighter distance threshold (i.e., $R_2$ is less than $R_1$, and the step size β is less than α) (identified as equations 4 and 5).

Updating the training dataset includes adding images corresponding to the newly received vector features 214 (e.g., t) as samples to the reference image dataset (i.e., D), and removing lower scored samples from the training dataset (i.e., D) when the training dataset becomes larger than a programmable size (i.e., N). In particular, if a vector feature 214 t has been identified by a human via confirmation 302 (i.e., c(t)) and there is no similar samples (i.e., s) in the training dataset (i.e., D), then the newly received vector feature 214 t is added to the training dataset (i.e., D). Where the reference image dataset (i.e., D) includes more than a defined number (i.e., N) of samples (identified as equation 7), the lowest scored sample (i.e., s*) in the training dataset is removed. In one particular embodiment, the values of the distance thresholds are $R_1=0.65$, $R_2=0.5$ and $R_3=0.3$.

The aforementioned approach promotes (i.e., increments) all identified neighbor samples (i.e., s) of the received feature vectors 214 (i.e., t). In an alternative embodiment, only the closest neighbor sample (i.e., s) of the newly received feature vectors 214 (i.e., t) is promoted. By limiting promotion to a single sample, representative samples are further emphasized. Such an approach can be particularly useful where the number of samples (i.e., s) for a particular individual in the training dataset (i.e., D) is small (e.g., fifty samples per individual).

Figure 4:
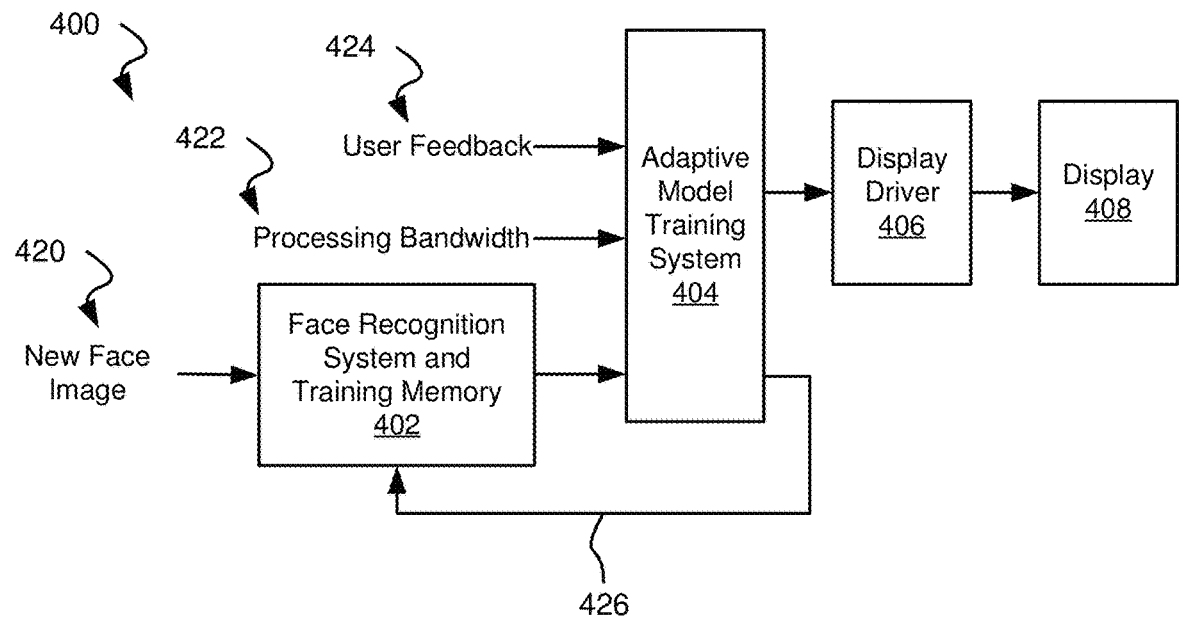
FIG. 4 is a block diagram of a face recognition system including facial dataset updating in accordance with various embodiments.
Figure 7:
FIG. 7 is an example of a training dataset for a single individual that may be formed and manipulated in accordance with the method discussed in relation to FIGS. 5A-5B.

Turning to FIG. 4, a block diagram of a face recognition system 400 including adaptive model training system 404 is shown in accordance with various embodiments. Facial training dataset training system 400 includes a face recognition system and training memory 402. This may be any facial recognition system known in the art. Face recognition system and training memory 402 receives an image (i.e., a new face image 420) that it tries to match using facial recognition processes. The facial recognition processes that are used may be any facial recognition process known in the art. An image match may be found where, for example, a threshold level of similarity is found between new face image 420 and one or more samples within a reference memory. The reference memory includes a number of training datasets for respective individuals. Thus, for example, the reference memory may include one hundred images of one individual organized as a facial training dataset for that individual. The training memory may include such facial training datasets for hundreds to billions of individuals depending upon the scale of the image recognition system. Turning to FIG. 7, an example set 700 of a facial training dataset for a particular individual is shown. In this case, the number of samples included in the facial training dataset is limited to eighty-four images. Based upon the disclosure provided herein, one of ordinary skills in the art will recognize different numbers of samples of a particular individual that may be maintained in accordance with different embodiments Returning to FIG. 4, face recognition system and training memory 402 reports the result of the facial recognition process to an adaptive model training system 404. Adaptive model training system 404 is configured to implement to adaptively modify the training dataset and produce machine learning models if necessary for each of a number of identified individuals. Adaptive model training system 404 scores samples of known individuals maintained in the reference image dataset, adds newly received samples to the number of face images from an identified individual, and removes samples that have scores suggesting that they are not as useful. In some embodiments, adaptive model training system 404 operates similar to that discussed below in relation to FIGS. 5A-5B.

Figure 5A:
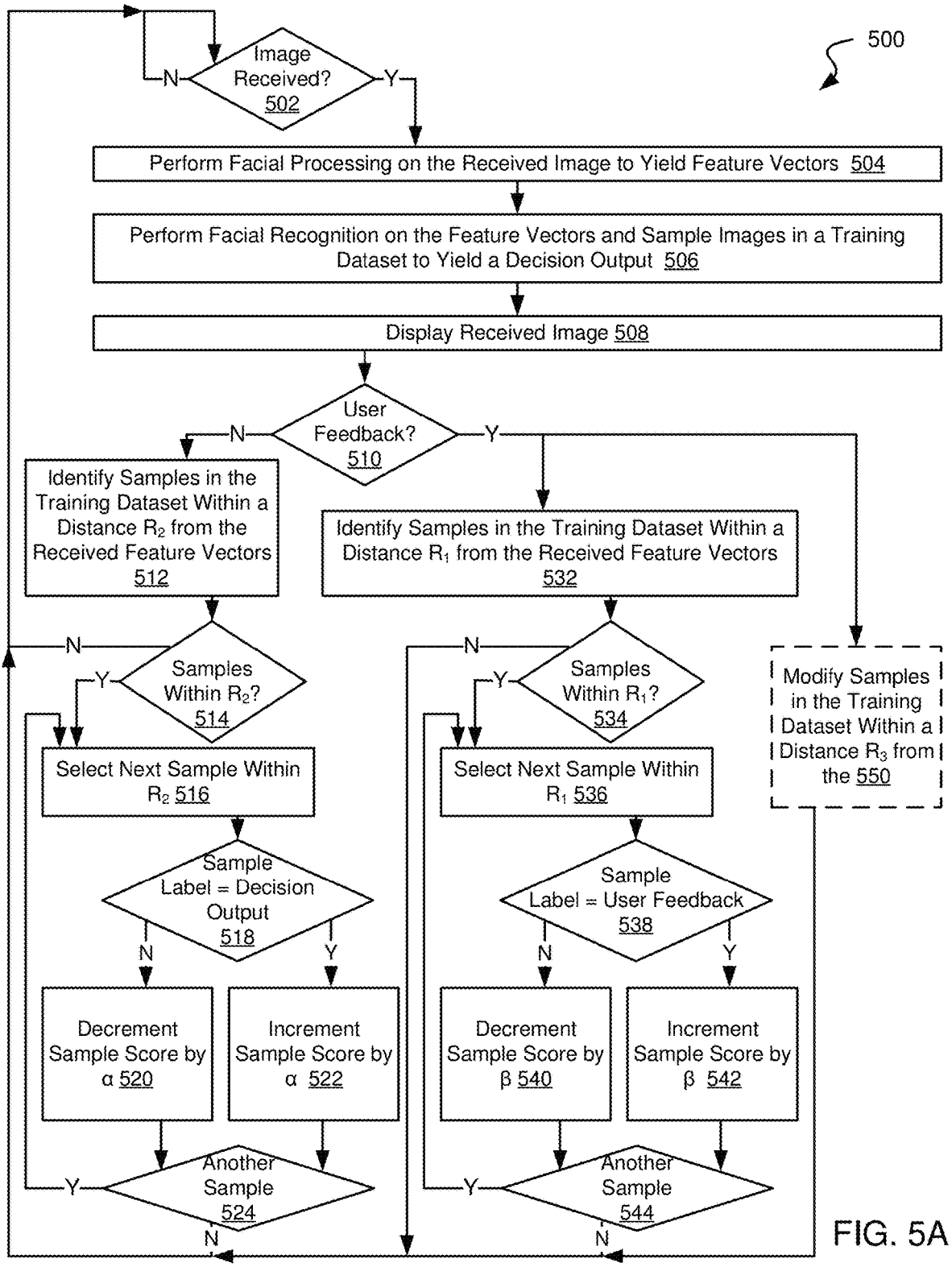
FIGS. 5A-5B are flow diagrams showing a method in accordance with some embodiments for building the training dataset.
Figure 5B:
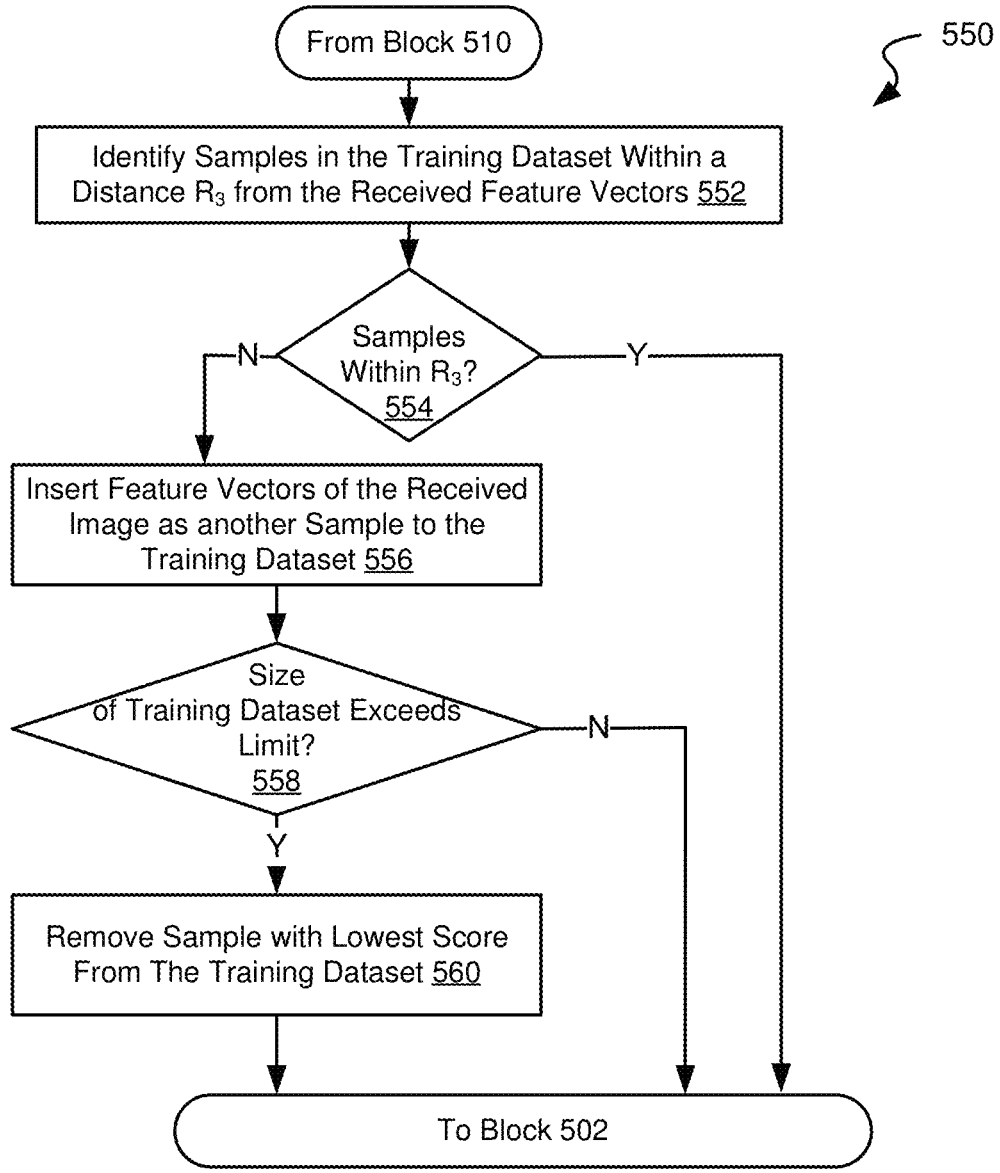

Turning to FIGS. 5A-5B, flow diagrams 500, 550 show a method in accordance with some embodiments for training a facial training dataset. Following flow diagram 500 of FIG. 5A, it is determined if an image has been received (block 502). Images may be received from any of a number of devices and/or locations. For example, in some cases images may be received from cameras (e.g., cameras 116, 152), or may be provided by a requester via the Internet. Based upon the disclosure provided herein, one of ordinary skills in the art will recognize a variety of sources from which images may be received and/or mechanisms by which the images may be received.

Where an image is received (block 502), various processing including facial recognition is applied to the image (block 504). Any types of processing known in the art may be applied to a received image to yield feature vectors corresponding to faces in the image. Examples of some such processes are discussed above in relation to FIG. 2. Facial recognition is applied where an inference engine compares the received feature vectors to one or more samples (i.e., samples of images corresponding to the identified individuals) maintained as part of a training dataset (block 506). This process results in decisions (i.e., represented as decision outputs) indicating a quality of a match between the recently received feature vectors and one or more of the reference images. In some embodiments, the decision scores vary from 0 to 1 with a score of 1 indicating a perfect match and 0 indicating no basis of a match. Based upon the disclosure provided herein, one of ordinary skills in the art will recognize a variety of facial recognition algorithms that may be used to process received image information relative to previously labeled image information in accordance with different embodiments.

The recently received image is displayed (block 508). This display may be via a graphical user interface accessible to a human user that is asked to identify the individual in the image. In some cases, a response (i.e., user feedback) is received confirming the accuracy of an indicated match between the received image and an individual linked to a matching sample in the training dataset (block 510). In other cases, no response indicating the accuracy is received (block 510).

Where a response indicating the accuracy is not received (block 510), samples in the training dataset that are within a programmable distance $R_2$ from the received feature vectors are identified (block 512). The value of $R_2$ is chosen based upon a presumption that the decision output of the facial recognition process of block 506 is assumed correct. Based upon this assumption, $R_2$ is programmed to be less than an $R_1$, which, as described below, is used when user feedback is received. In one particular embodiment, $R_2$ is programmed as 0.5 and $R_1$ is programmed as 0.65. Here distance indicates a similarity between the sample and the received feature vector where the lower distance indicates a higher degree of similarity than a higher distance.

It is determined whether any sample in the training dataset are within the distance $R_2$ of the received feature vectors (block 514). Where one or more samples are within the distance (block 514), the first/next sample is selected (block 516). It is determined whether the sample label for the selected sample is equal to the decision output for the feature vector generated in block 506 (block 518). Where the sample label does not match the sample output (block 518), the sample score for the selected sample in the training dataset is decremented by a programmable value $\alpha$. In some embodiments, $\alpha$ is greater than a programmable value $\beta$ (3, which, as described below, is used when user feedback is received. As with the difference between the values for $R_2$ and $R_1$, where no user feedback is available, the decision output made in block 506 is assumed to be correct (albeit with low confidence) and for that reason the step size $\alpha$ is programmed to be greater than the step size $\beta$. Alternatively, where the decision output does match the sample label (block 518), the sample score for the selected sample in the training dataset is incremented by the programmable value $\alpha$. It is determined whether any more samples were within the distance (block 524). Where other samples remain to be processed (block 524), the processes of blocks 516-524 are repeated for the next sample.

Alternatively, where user feedback is available (block 510), samples in the training dataset that are within a programmable distance $R_1$ from the received feature vectors are identified (block 532). It is determined whether any sample in the training dataset is within the distance $R_1$ of the received feature vectors (block 534). Where one or more samples are within the distance (block 534), the first/next sample is selected (block 536). It is determined whether the sample label for the selected sample is equal to the user feedback. (block 510). Where the sample label does not match the user feedback, it is assumed that the sample is not a good representation of the received feature vector. Thus, in the case where the sample label does not match the user feedback (block 538), the score for the selected sample in the training dataset is decremented by a programmable value β. In contrast, where the sample label does match the user feedback, the user feedback has confirmed the match result. In this where the sample label does match the user feedback (block 538), the score for the selected sample in the training dataset is incremented by a programmable value β. It is determined whether any more samples were within the distance (block 544). Where other samples remain to be processed (block 544), the processes of blocks 536-544 are repeated for the next sample.

Additionally, where user feedback is available (block 510), samples within the training dataset may be modified (i.e., added or eliminated) based upon a distance $R_3$ from the received vector features (block 550). To allow for efficient operation of large-scale image recognition systems, the number of samples considered or maintained in each training dataset may be limited. Where such limiting is to be applied, the processes of flow diagram 550 operate to eliminate consideration of one or more individual images (i.e., samples) from the training dataset where they fail to produce matches and/or fail to receive user feedback indicating the image is of the individual that is matched. Addition of samples to the training dataset is tightly controlled and thus the value of distance $R_3$ is programmed to be less than either of the distances distance $R_1$ or distance $R_2$. In one embodiment, $R_1$ is programmed as 0.65, $R_2$ is programmed as 0.5, and $R_3$ is programmed as 0.3. Block 550 is shown in dashed lines as it is represented by a flow diagram 550 (purposely the same number) shown in FIG. 5B. Elimination of samples is based on the scores of samples in the training set, i.e., sample with lowest score shall be eliminated first (block 560).

Figure 6A:
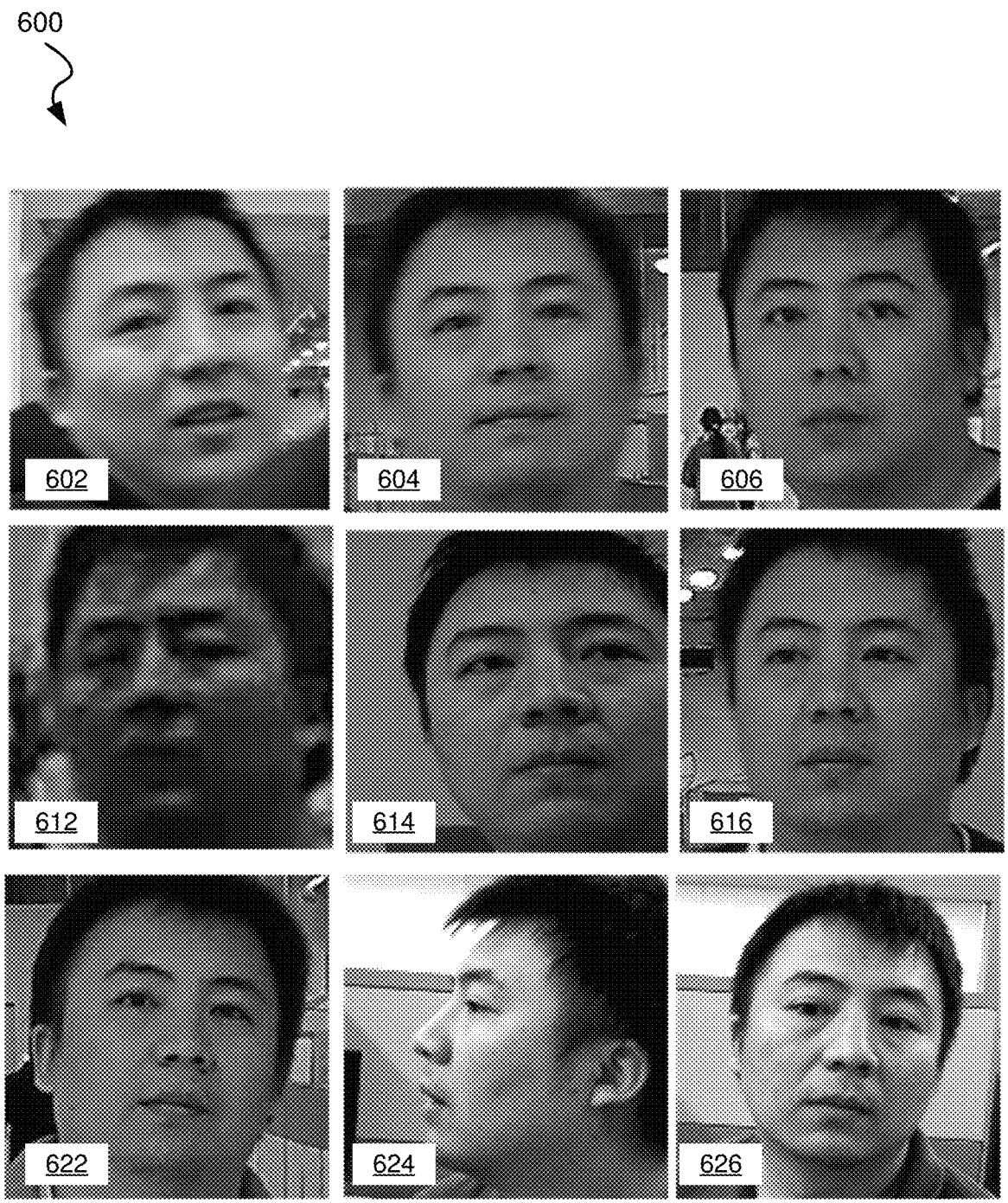
FIG. 6A is an example of a good training dataset for a single individual that may be formed and manipulated in accordance with the method discussed in relation to FIGS. 5A-5B.
Figure 6B:
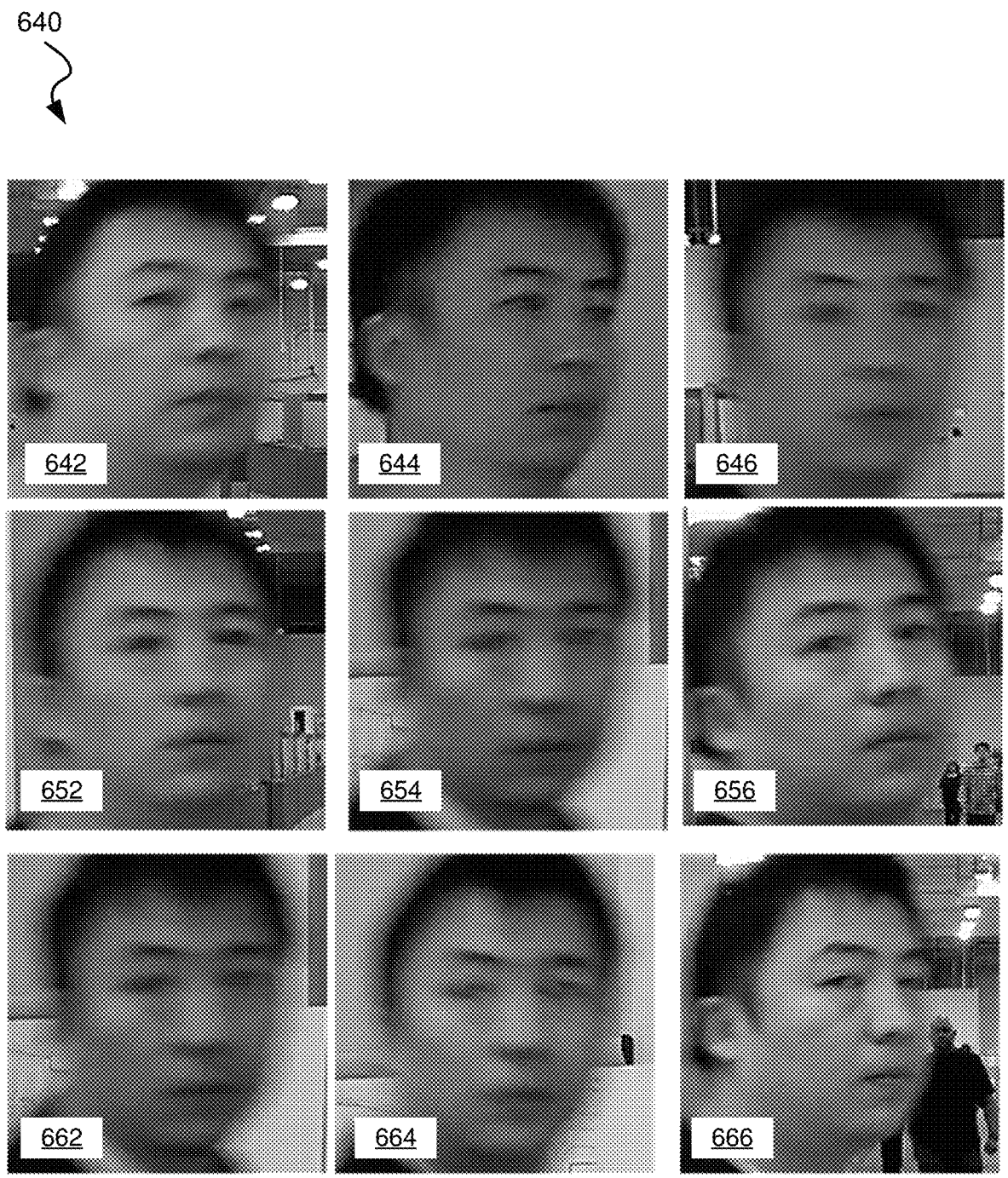
FIG. 6B is an example of a poor training dataset for a single individual that may be formed and manipulated in accordance with the method discussed in relation to FIGS. 5A-5B.

The process of eliminating poor samples and adding new samples from/to the training dataset relies on the sample scores that are modified using the processes discussed above in relation to FIG. 5A. This process of selectively adding and eliminating samples adaptively enhances the utility of images that are maintained, and in turn the accuracy of facial recognition using the training dataset. Turning to FIG. 6A, an example set 600 of a good facial training dataset is shown for a single individual. As shown, example set 600 includes nine samples (samples 602, 604, 606, 612, 614, 616, 622, 624, 626) that show the individual in different poses and lighting, and are all generally clear images. In contrast, turning to FIG. 6B, an example set 640 shows a relatively poor facial training dataset for a single individual. As shown, example set 640 includes nine samples (samples 642, 644, 646, 652, 654, 656, 662, 664, 666) that show the individual in substantially similar poses and lighting, and are all generally somewhat blurry. The process of flow diagram 550 is to slowly replace images in, for example, example set 640 with images that are clearer, offer different poses, and/or better lighting to train or adapt example set 640 to be more like example set 600.

Turning to FIG. 5B and following flow diagram 550, samples in the training dataset that are within a programmable distance $R_3$ from the received feature vectors are identified (block 552). It is determined whether any samples within the training dataset were within the distance $R_3$ of the received feature vectors (block 554). Where one or more samples are within the distance (block 554), then no additions or deletions are made to the training sample database and processing is returned to block 502 of flow diagram 500. It is assumed that it is less meaningful to have two very similar samples in the training set.

Alternatively, where no sample were within the distance (block 554) indicating that the image corresponding to the newly received feature vectors is a meaningful addition to the training dataset, the image corresponding to the feature vectors is added to the training dataset as another sample of the matched individual (block 556). In this way, the training dataset can be grown to include more and better images and thus becomes more representative and a better machine learning model can be produced.

It is then determined whether the number of samples of the matched individual in the training dataset has exceeded a programmable size (block 558). Again, to assure efficient operation of a facial recognition system the number of images used for comparison are maintained within defined limits. Turning to FIG. 7, example set 700 of samples of a particular individual in a training dataset is shown. In this case, the number of samples is limited to eighty-four images. Based upon the disclosure provided herein, one of ordinary skills in the art will recognize different numbers of samples of a particular individual that may be maintained in accordance with different embodiments.

Where it is determined, that the number of samples has exceeded the programmed size (block 558), the sample for the matched individual that has the lowest sample score is eliminated from the training dataset (block 560) and processing is returned to block 502 of flow diagram 500. Otherwise, where it is determined that the number of samples has exceeded the programmed size (block 558), then no deletions are made from the reference image database and processing is returned to block 502 of flow diagram 500.

Figure 8:
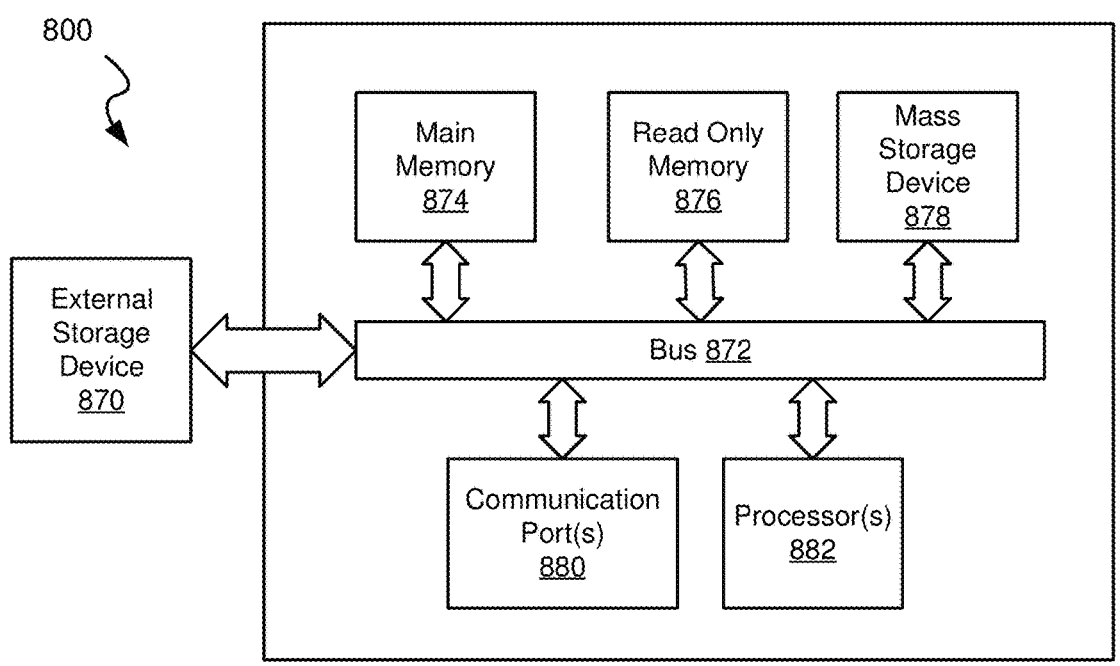
FIG. 8 illustrates an example computer system in which or with which embodiments of the present disclosure may be utilized.

FIG. 8 illustrates an example computer system 800 in which or with which embodiments of the present disclosure may be utilized. As shown in FIG. 8, the computer system includes an external storage device 870, a bus 872, a main memory 874, a read-only memory 876, a mass storage device 878, one or more communication ports 880, and one or more processing resources (e.g., processors 882). In one embodiment, computer system 800 may represent some portion of a camera (e.g., camera 116a-n), a surveillance system (e.g., surveillance system 102), or a face recognition system (e.g., face recognition system 104).

Those skilled in the art will appreciate that computer system 800 may include more than one processing resource 882 and communication port 880. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 882 may include various modules associated with embodiments of the present disclosure.

Communication port 880 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 874 can be Random Access Memory (RAM), or any other dynamic storage device commonly known in the art. Read only memory 876 can be any static storage device(s) e.g., but not limited to, a Programmable Read Only Memory (PROM) chips for storing static information e.g. start-up or BIOS instructions for the processing resource.

Mass storage 878 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 872 communicatively couples processing resource(s) with the other memory, storage and communication blocks. Bus 872 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 872 to support direct operator interaction with the computer system. Other operator and administrative interfaces can be provided through network connections connected through communication port 880. External storage device 870 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned example computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the example hardware, software, processes, methods, and/or operating systems described herein are for illustrative purposes and, thus, are not intended to be limited to any particular name. While the foregoing describes various embodiments of the disclosure, other and further embodiments may be devised without departing from the basic scope thereof.

What is claimed is:

1. A facial recognition system, the system comprising:
a processing resource;
a non-transitory computer-readable medium, having stored therein: (a) a training dataset including a plurality of samples of image features that correspond to an individual, wherein each sample in the training dataset includes a respective sample score; and (b) instructions that when executed by the processing resource cause the processing resource to:
receive an input image;
receive a match score indicating a correspondence of the input image to a first sample in the training dataset;
receive a user feedback about a label of the input image;
modify the score corresponding to the first sample, the modification including:
incrementing the score by a first value if the user feedback on the label of the input image is equal to a label of the first sample; or
decrementing the score by the first value if the user feedback on the label of the input image is not equal to the label of the first sample; and
remove lower scored samples from the training dataset to reduce computational complexity of facial recognition.

2. The system of claim 1, wherein the non-transitory computer-readable medium further includes instructions that when executed by the processing resource cause the processing resource to:
compare the input image with at least a subset of the plurality of samples in the training dataset; and
generate a decision output.

3. The system of claim 2, wherein modifying the score corresponding to the first sample includes modifying the score based at least in part on the decision output.

4. The system of claim 2, wherein modifying the score corresponding to the first sample includes modifying the score based on both the decision output and the user feedback.

5. The system of claim 1, wherein modifying the score corresponding to the first sample includes modifying the score based at least in part on the user feedback.

6. The system of claim 1, wherein the non-transitory computer-readable medium further includes instructions that when executed by the processing resource cause the processing resource to:
identify a failure to receive the user feedback about the label of the input image; and
wherein upon failure to receive the user feedback about the label of the input image, the modifying the score corresponding to the first sample includes:
incrementing the score by a second value where the label of first sample is equal to the decision output; or
decrementing the score by the second value where the label of first sample is not equal to the decision output.

7. The system of claim 6, wherein a magnitude of the second value is less than a magnitude of the first value.

8. The system of claim 1, wherein the score is a first score, wherein the non-transitory computer-readable medium further includes instructions that when executed by the processing resource cause the processing resource to:
receive a second match score indicating a correspondence of the input image to a second sample, wherein the second sample is one of the plurality of samples; and
based at least in part upon the second match score, modify a second score corresponding to the second sample.

9. The system of claim 1, wherein the non-transitory computer-readable medium further includes instructions that when executed by the processing resource cause the processing resource to:
  add the input image to the training dataset as a second sample in the plurality of image feature vectors in the training dataset.

10. A method for building a training dataset; the method comprising:
  receiving an input image by a processing resource;
  receiving, by the processing resource, a match score indicating a correspondence of the input image to a first sample, wherein the first sample is one of the plurality of image feature vectors in the training dataset;
  receiving, by the processing resource, a user feedback about a label of the input image; modifying, by the processing resource, the score corresponding to the first sample, the modification including:
    incrementing the score by a first value if the user feedback on the label of the input image is equal to a label of the first sample; or
    decrementing the score by the first value if the user feedback on the label of the input image is not equal to the label of the first sample; and
  removing lower scored samples from the training dataset to reduce computational complexity of facial recognition.

11. The method of claim 10, wherein the method further comprises:
  identifying, by the processing resource, a failure to receive a user feedback about the label of the input image (ground-truth); and
  wherein modifying the first sample score corresponding to the first image includes:
  incrementing the first sample score by a second value where the label of first sample is equal to the decision output; or
  decrementing the first sample score by the second value where the label of first sample is not equal to the decision output.

12. The method of claim 11, wherein a magnitude of the second value is less than a magnitude of the first value.

13. The method of claim 10, wherein the method further comprises:
  identifying, by the processing resource, a failure to receive a user feedback about the label of the input image (ground-truth); and
  wherein modifying the first sample score corresponding to the first sample includes:
  incrementing the first sample score by a second value where the label of first sample is equal to the decision output; or
  decrementing the first sample score by the second value where the label of first sample is not equal to the decision output.

14. The method of claim 10, further comprising:
  adding the input image to the training dataset as a second sample in the plurality of image feature vectors in the training dataset.

15. A non-transitory computer-readable storage medium embodying a set of instructions, which when executed by one or more processing resources of a computer system, causes the one or more processing resources to perform a method comprising:
  receiving an input image;
  receiving a match score indicating a correspondence of the input image to a first sample, wherein the first sample is one of a plurality of image feature vectors in a training dataset;
  receiving, by the processing resource, a user feedback about a label of the input image;
  modifying, by the processing resource, the score corresponding to the first sample, the modification including:
    incrementing the score by a first value if the user feedback on the label of the input image is equal to a label of the first sample; or
    decrementing the score by the first value if the user feedback on the label of the input image is not equal to the label of the first sample; and
  removing lower scored samples from the training dataset to reduce computational complexity of facial recognition.

16. The non-transitory computer-readable storage medium of claim 15, wherein the set of instructions, which when executed by one or more processing resources of a computer system, causes the one or more processing resources to perform a method comprising:
  identifying a failure to receive a user feedback about the label of the input image; and
  wherein modifying the first sample score corresponding to the first sample includes:
  incrementing the first sample score by a second value where the label of first sample is equal to the decision output; or
  decrementing the first sample score by the second value where the label of first sample is not equal to the decision output.

17. The non-transitory computer-readable storage medium of claim 15, wherein the set of instructions, which when executed by one or more processing resources of a computer system, causes the one or more processing resources to perform a method comprising: adding the input image to the training dataset as a second sample in the plurality of image feature vectors in the training dataset.

* * * * *